(12) United States Patent
Ghosh et al.

(10) Patent No.: US 8,114,535 B2
(45) Date of Patent: Feb. 14, 2012

(54) METERING SCHEMES FOR REDUCING THERMAL SPREAD IN A BATTERY PACK

(75) Inventors: Debashis Ghosh, Williamsville, NY (US); Steven C. Guzy, East Amherst, NY (US)

(73) Assignee: Delphi Technologies, Inc., Troy, MI (US)

( * ) Notice: Subject to any disclaimer, the term of this patent is extended or adjusted under 35 U.S.C. 154(b) by 1272 days.

(21) Appl. No.: 11/820,953

(22) Filed: Jun. 21, 2007

(65) Prior Publication Data
US 2008/0318118 A1  Dec. 25, 2008

(51) Int. Cl.
*H01M 10/50* (2006.01)
*H01M 2/12* (2006.01)
(52) U.S. Cl. ............. 429/88; 429/120; 429/148; 429/90
(58) Field of Classification Search .................. None
See application file for complete search history.

(56) References Cited

U.S. PATENT DOCUMENTS

| 6,569,556 B2 * | 5/2003 | Zhou et al. ................... 429/88 |
| 2005/0153199 A1 * | 7/2005 | Yagi et al. .................... 429/148 |
| 2005/0269995 A1 * | 12/2005 | Donnelly et al. ............. 320/150 |

* cited by examiner

*Primary Examiner* — Barbara Gilliam
*Assistant Examiner* — Angela Martin
(74) *Attorney, Agent, or Firm* — James M. Chan

(57) ABSTRACT

A battery pack assembly comprising a plurality of battery packs each including a plurality of cells and at least one metering plate for metering the quantity of air flowing respectively through each of the air paths of the battery packs. An inlet metering plate is disposed upstream of the battery packs to meter the uneven flow of cooling air generated by the inlet manifold. The inlet metering plate utilizes a plurality of apertures, which can vary in size and shape, to produce equal streams of cooling air to cool all the battery packs to a substantially uniform temperature. An outlet metering plate can be disposed downstream of the battery packs to meter the flow of outgoing cooling air through the channels of the upper cylindrical sections to produce equal air flow around all of the cells in a stack to cool all of the cells to a substantially uniform temperature.

18 Claims, 7 Drawing Sheets

METERING SCHEMES FOR REDUCING THERMAL SPREAD IN A BATTERY PACK

BACKGROUND OF THE INVENTION

1. Field of the Invention

The present invention relates to a battery pack assembly for providing electrical power.

2. Description of the Prior Art

It is well known to combine a number of battery packs, each including a number of individual cells, for providing electrical power. Heat is generated as electrical current flows into and out of the cells, which heat can have a significant negative impact on the performance and lifetime of the cells and of the battery pack assembly as a whole, if the heat is not effectively managed. Limiting and maintaining the temperature across the various cells in the multiple battery packs can be important in maximizing the performance and lifetime of the entire battery pack assembly.

To maintain the battery packs and the cells at a desired temperature, a cooling system is often provided within the battery pack assembly. Conventionally, these cooling systems pass air over and around the battery packs and the cells via an inlet manifold and an outlet manifold. In this type of system, the cooling air absorbs heat as it passes over the cells and loses its capacity to absorb heat as it passes over the cells to create temperatures cooler near the inlet manifold than the warmer temperatures near the outlet manifold.

The U.S. Pat. No. 6,569,556 to Zhou et al., discloses such a cooling system including an inlet manifold and an outlet manifold that direct an air flow through the cells.

Although the prior art discloses systems that cool cells and battery packs within a battery pack assembly by passing cooling air through the assembly, significant temperature differences occur from battery pack to battery pack and from cell to cell due to the non-uniform nature of the source of the cooling air. These temperature differences are detrimental to the performance and lifetime of the battery pack assembly.

SUMMARY OF THE INVENTION AND ADVANTAGES

The invention provides for a battery pack assembly for providing electrical power comprising a plurality of battery packs each of which includes a plurality of cells each having an anode and a cathode for storing and transmitting electrical power. The battery packs are disposed in a side by side relationship and each battery pack defines an air path therethrough for cooling. The assembly includes at least one metering device for metering the quantity of air flowing respectively through each of the air paths to evenly cool all of the battery packs to a substantially uniform temperature.

Accordingly, the metering device receives the non-uniform air flow from an inlet manifold and distributes that air flow equally to each individual battery pack via a plurality of variably-shaped apertures.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
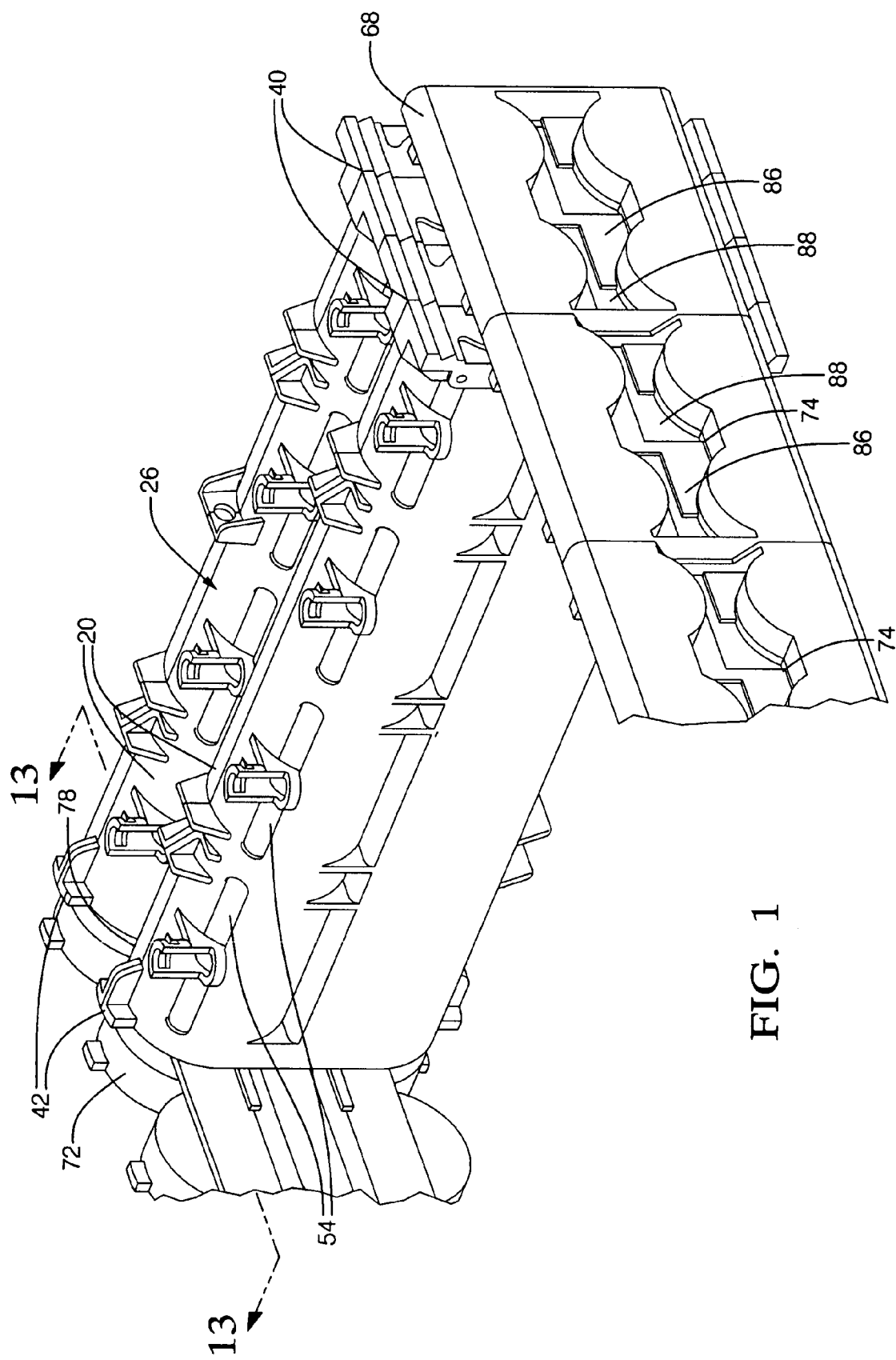
FIG. 1 is a perspective view of the invention.

Referring to the Figures, wherein like numerals indicate corresponding parts throughout the several views, a battery pack assembly for providing electrical power is shown, in part, in FIG. 1. The battery pack assembly comprises a plurality of battery packs 20, each generally indicated.

Figure 2:
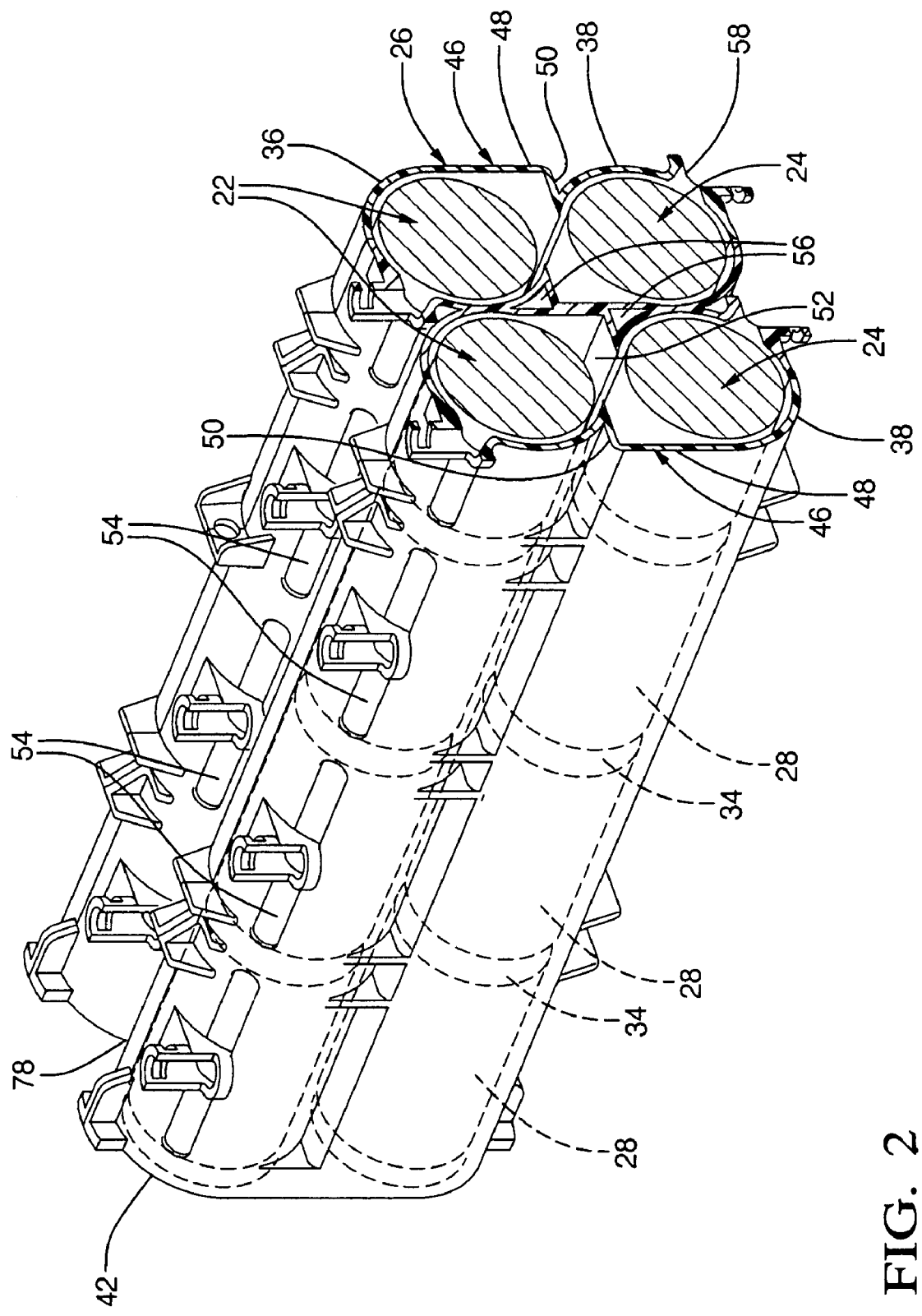
FIG. 2 is a perspective view also in cross-section of a pair of battery packs used in the embodiment of FIG. 1.
Figure 3:
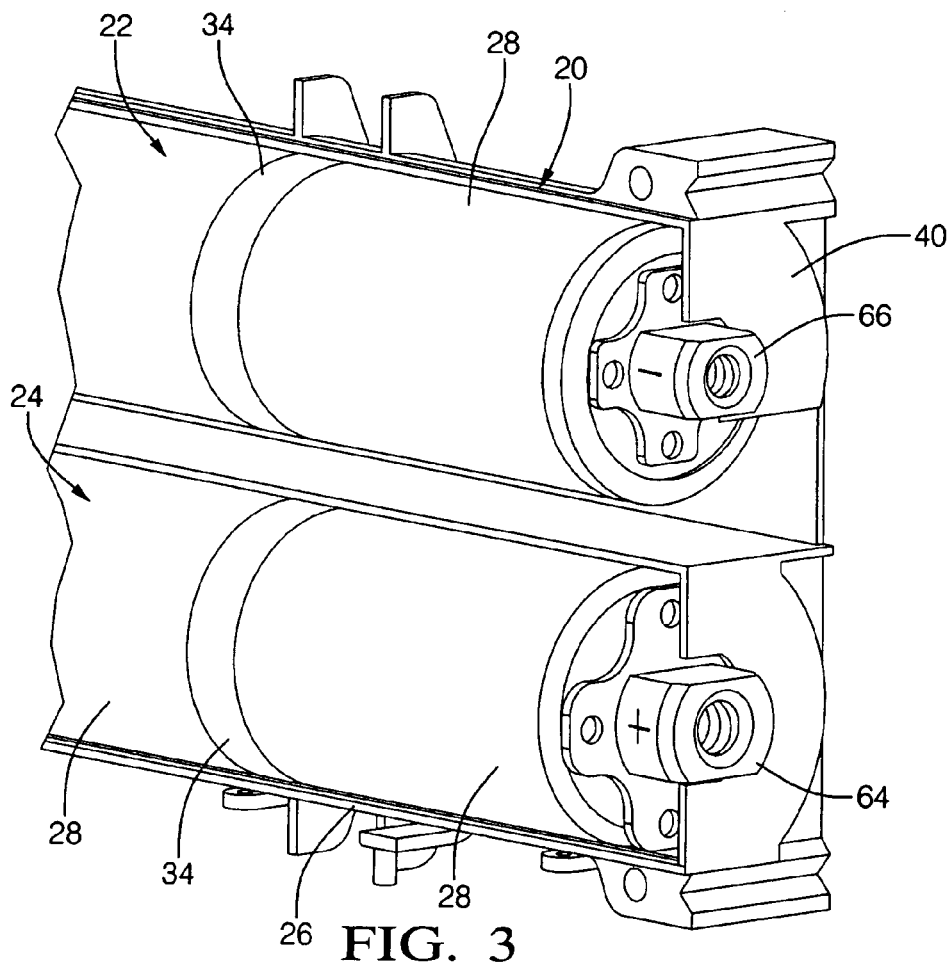
FIG. 3 is a fragmentary front perspective view also in cross-section of the embodiment of FIG. 1 but showing one battery pack.

The battery packs 20 are disposed in a side by side relationship, a pair of which are shown in FIG. 2. Each battery pack 20 extends longitudinally and includes an upper stack 22, a lower stack 24, and a casing 26 supporting the stacks 22, 24. All of the stacks 22, 24 are of equal or the same length and extend along parallel and spaced axes. Each stack includes a plurality of cylindrical cells 28 and each cell 28 defines a cylinder and has an anode 30 at one end and a cathode 32 disposed at the opposite end of the cylinder, for storing and conducting electrical power. Alternatively, each stack could include any number of cells 28 and the cells 28 could be a geometric shape other than a cylinder. The cells 28 are arranged in cathode-to-anode relationship with one another along the respective axis, as is well known in the art. The anodes 30 of the cells 28 in the upper stack 22 face in one direction while the anodes 30 of the cells 28 in the lower stack 24 face in the opposite direction, as illustrated in FIG. 3. As such, the cells 28 of each stack are connected to one another in electrical series connection. Additionally, each cell 28 includes a spacer 34 which is cylindrical in shape and wraps around the cell 28 to create a space for air flow between the cells 28 and the casing 26. The spacer 34 is made out of an insulating material such as rubber or plastic.

The casing 26 includes an upper cylindrical section 36 and a lower cylindrical section 38, a front end cover 40, and a back end cover 42. The front end cover 40 is disposed at the front of the battery pack 20 while the back end cover 42 is disposed at the back of the battery pack 20. The end covers 40, 42 enclose the ends of the casings 26. The casing 26 nests the upper stack 22 above the lower stack 24. The upper cylindrical section 36 wraps around a portion of the cylindrical walls of the cylindrical cells 28 of the upper stack 22 and extends along the length of the upper stack 22. As illustrated in FIG. 2, the casing 26 also includes a reverse-L-shaped piece 46, generally indicated, that joins the upper cylindrical section 36 to enclose the remaining portion of the cylindrical walls of all the cells 28. The reverse-L-shaped piece 46 includes a long leg 48 that extends vertically and tangentially from the upper cylindrical section 36 adjacent to the right-hand side of the upper stack 22. The reverse-L-shaped piece 46 also includes a short leg 50 that extends transversely to the long leg 48 and connects with the upper cylindrical section 36 adjacent to the bottom side of the upper stack 22. In other words, the upper stack 22 is enwrapped by a combination of the upper cylindrical section 36 and the reverse-L-shaped piece 46; the upper cylindrical section 36 wraps around the upper-right, upper-left, and lower-left portions of the upper stack 22 and the reverse-L-shaped piece 46 encloses the lower-right portion. The long leg 48 and the short leg 50 define a reverse-L-shaped inlet chamber 52 for supplying air to the space between the upper cylindrical section 36 of the casing 26 and the cells 28. As noted above, the spacers 34 create this space by preventing the casing 26 from contacting the cells 28.

The upper cylindrical section 36 of the casing 26 also defines a plurality of upper exits 54 that are axially aligned in the upper cylindrical section 36 diametrically opposite the reverse-L-shaped piece 46. These upper exits 54 discharge cooling air flowing from the inlet chamber 52 and over the cells 28 of the upper stack 22 via the space created by the spacers 34.

The lower cylindrical section 38 of the casing 26 has a configuration identical to that of the upper cylindrical section 36. The lower cylindrical section 38 is disposed directly below the upper cylindrical section 36 and is rotated one hundred eighty degrees (180°) with respect to the upper cylindrical section 36. In this arrangement, the short leg 50 connected to one cylindrical section is tangent to the other cylindrical section. As such, the reverse-L-shaped air inlet chambers 52 are open to one another and in fluid communication. Additionally, the casing 26 defines an open recess 56 being triangularly shaped between the short leg 50 connected to one cylindrical section and the exterior of the other cylindrical section.

Similar to the upper cylindrical section 36, the lower cylindrical section 38 defines a plurality of lower exits 58 that are axially aligned in the lower cylindrical section 38 diametrically opposite the reverse-L-shaped piece 46 and diametrically opposite the upper exits 54 of the upper cylindrical section 36. These lower exits 58 discharge cooling air flowing from the inlet chamber 52 and over the cells 28 of the lower stack 24 via the space created by the spacers 34.

The air path created by the casing 26 and the spacers 34 flows from the two reverse-L-shaped inlet chambers 52, along the length of the stacks 22, 24, around the cells 28 via the space created by the spacers 34, and out the exits 54, 58.

As shown in FIG. 3, the end covers 40, 42 are generally rectangular in shape. Each of the front end covers 40 defines an entry 62 that aligns with the inlet chambers 52 for conveying the cooling air through the end cover and into the inlet chambers 52. The back end covers 42 are solid and prevent cooling air from exiting therethrough. As such, the cooling air is forced over the cells 28 and out the upper and lower exits 54, 58.

Each of the end covers 40, 42 also includes a positive terminal 64 that aligns with the anode 30 of the outermost the cell 28 of one stack and a negative terminal 66 that aligns with the cathode 32 of the outermost the cell 28 of the other stack. These terminals 64, 66 protrude through their respective end cover and contact the anode 30 or cathode 32 of the respective cell 28 to transmit the electrical power generated by the cells 28 in the stacks 22, 24. To facilitate the loading of the cells 28 into the casings 26, each casing 26 is split longitudinally into two pieces that snap together.

An inlet bus bar 68 is disposed along the front end covers 40 of the battery packs 20 for interconnecting the battery packs 20. The arrangement of the battery packs 20 is such that alternate battery packs 20 having the positive terminal 64 extending from the upper stack 22 are interleaved with battery packs 20 having the positive terminal 64 extending from the lower stack 24. In other words, adjacent battery packs 20 have the reverse terminal configuration. If one battery pack 20 has the positive terminal 64 on the top, the next adjacent battery pack 20 has the positive terminal 64 on the bottom. The inlet bus bar 68 includes a plurality of connection wires 70 for electrically connecting the stacks 22, 24 of one battery pack 20 to one another and the battery packs 20 to one another in series connection. The connection wires 70 of the inlet bus bar 68 connect the positive terminal 64 of one battery pack 20 to the negative terminal 66 of the next adjacent battery pack 20.

The inlet bus bar 68 defines a plurality of openings 74, which openings 74 align with the inlet chambers 52 for conveying the cooling air through the inlet bus bar 68 and into the inlet chambers 52. The shape of these openings 74 and the subsequent alignment with the inlet chambers 52 can vary depending upon the configuration of the battery pack 20 assembly. In a first embodiment, each opening 74 aligns with two battery packs 20. The shape of the inlet chambers 52 generally defines the periphery of opening 74. Alternatively, a differently shaped casing 26 that encloses differently shaped cells 28 would, accordingly, have different shaped openings 74 in the inlet bus bar 68.

Figure 4:
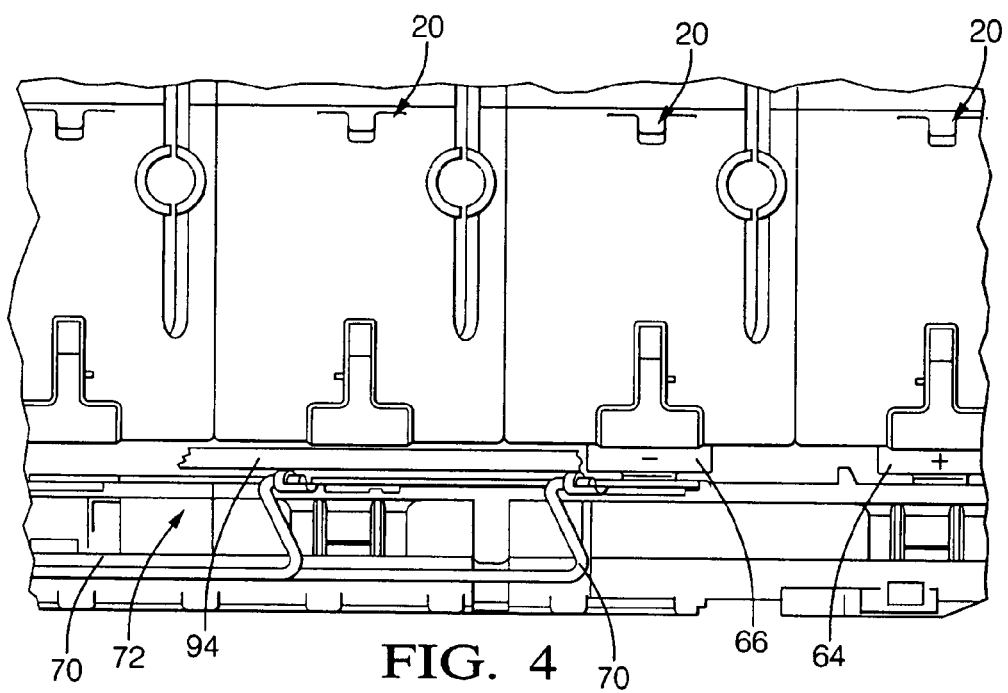
FIG. 4 is a top view of the rear end of the embodiment of FIG. 1.

Referring generally to all embodiments, an outlet bus bar 72 is disposed along the back end covers 42 of the battery packs 20 for interconnecting the stacks 22, 24 of each battery pack 20. As is generally indicated in FIG. 4, the outlet bus bar 72 also includes a plurality of connection wires 70. The connection wires 70 of the outlet bus bar 72 connect the positive terminal 64 of one battery pack 20 to the negative terminal 66 of the same battery pack 20. The connections of the inlet bus bar 68 and outlet bus bar 72 combine to connect the all the cells 28 of all the battery packs 20 in series.

The outlet bus bar 72 is solid and prevents air from exiting therethrough. As such, the cooling air is forced over the cells 28 and out the upper and lower exits 54, 58.

A housing 76 encloses the battery packs 20. The side by side relationship of the casing 26 of the battery packs 20 creates V-shaped channels 78 between adjacent upper cylindrical sections 36 and between adjacent lower cylindrical sections 38. The upper or lower cylindrical sections 36, 38 define the walls of the respective channels 78 while the housing 76 defines top or bottom of the channels 78. Each channel 78 extends the length of the battery pack 20. The upper and lower exits 54, 58 defined by the casing 26 discharge cooling air away from the cells 28 and into the channels 78, which convey the air away from the assembly.

Figure 5:
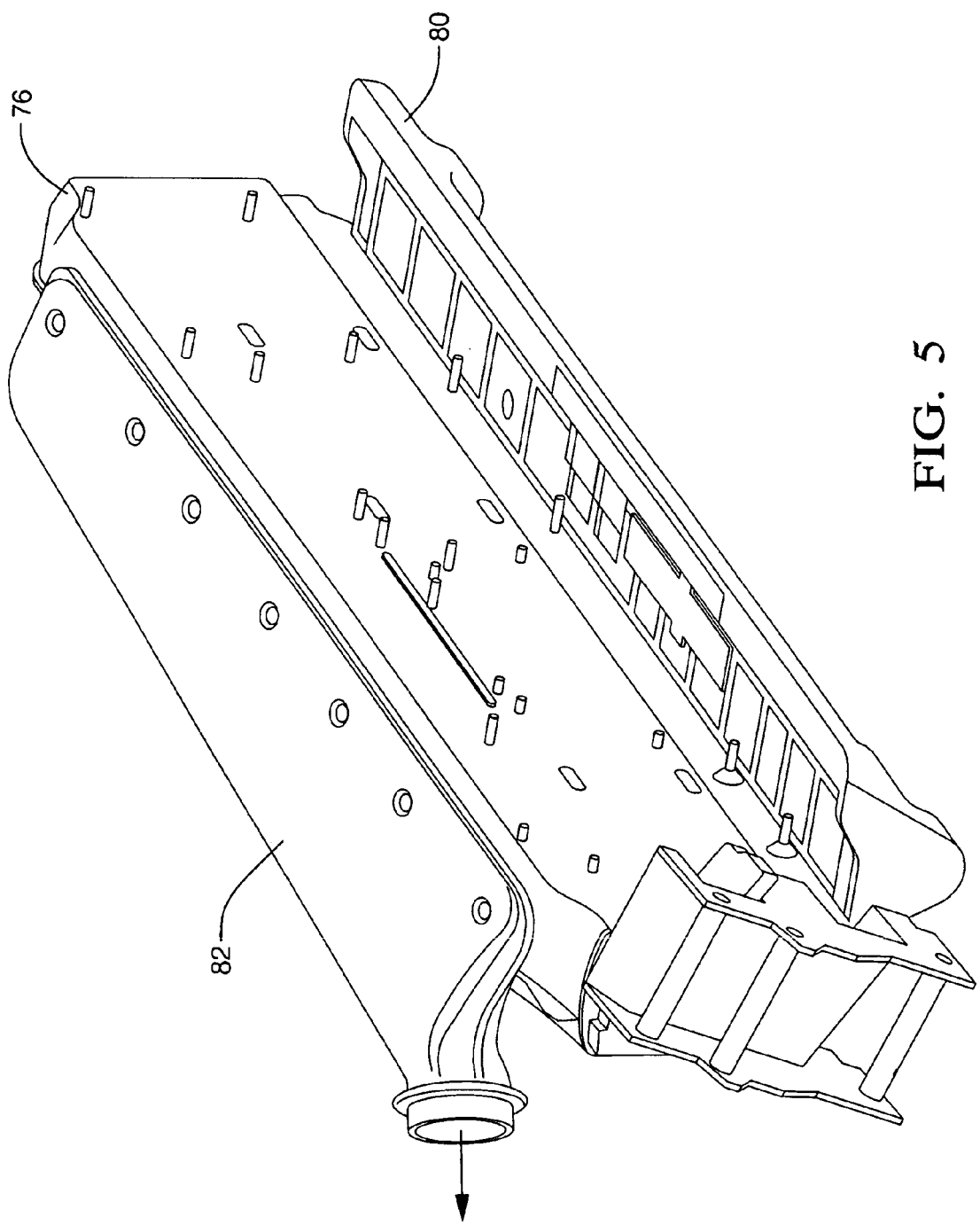
FIG. 5 is a perspective view of the entire assembly including the housing and the inlet and outlet manifolds.

As shown in FIG. 5, an inlet manifold 80 and an outlet manifold 82 are disposed outwardly of the housing 76 along the front and back ends of the battery packs 20, respectively, to establish a flow of cooling air through the assembly. The housing 76 defines a hole through the inlet manifold 80 supplies cooling air to the system. The housing 76 also defines a hole through which cooling air is conveyed to the outlet manifold 82, which discharges the cooling air from the assembly.

The inlet manifold 80 extends parallel to the inlet bus bar 68 and is spaced from the front end covers 40 of the casing 26. The inlet bus bar 68 is disposed between the inlet manifold 80 and the front end covers 40. The outlet manifold 82 extends parallel to the inlet manifold 80 and along the back end covers 42 of the casing 26. The outlet bus bar 72 is disposed between the outlet manifold 82 and the backs of the battery packs 20.

Figures 6, 7:
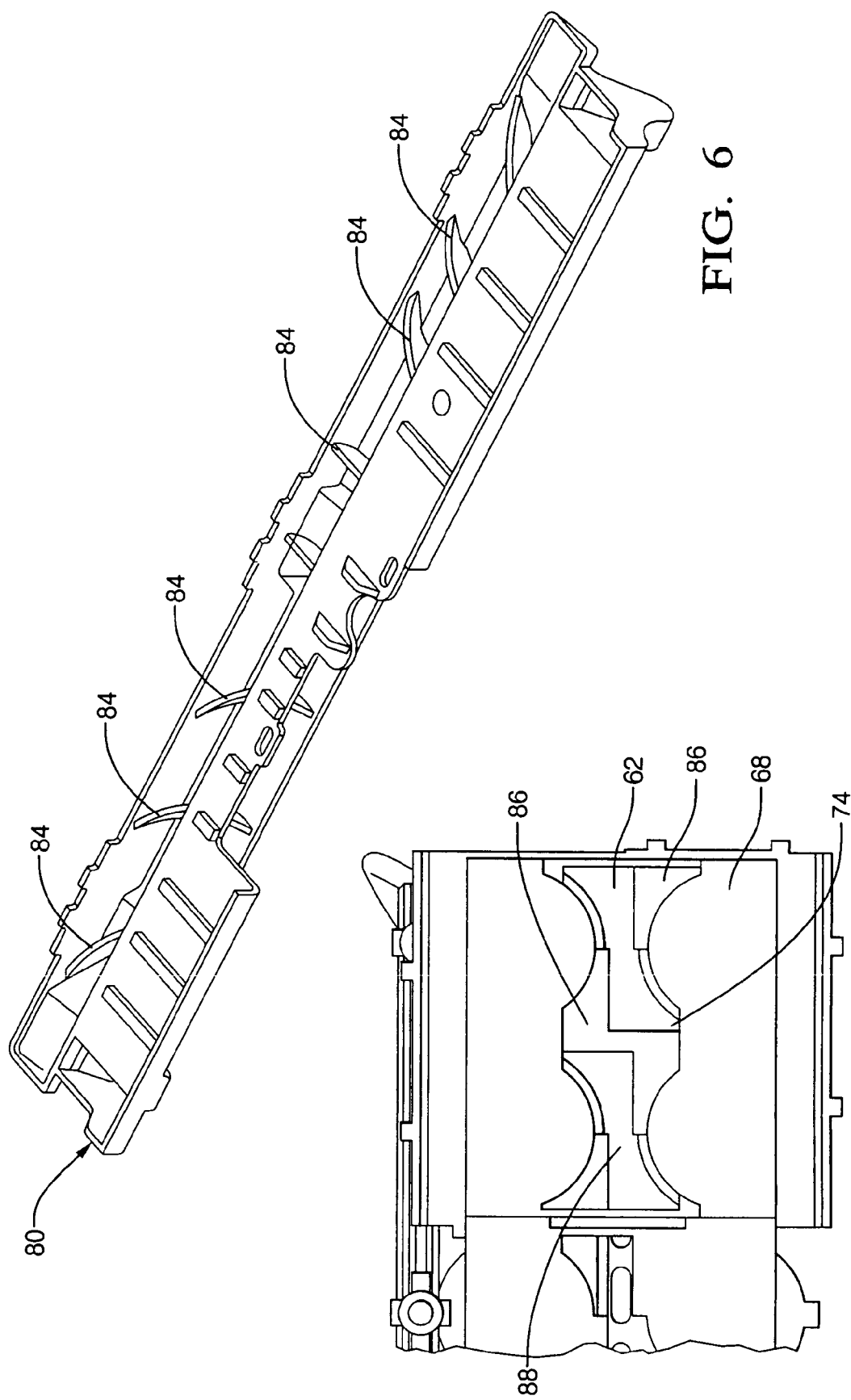
FIG. 6 is a perspective view of an inlet manifold of the embodiment of FIG. 5.
FIG. 7 is a partial front view of the embodiment of FIG. 1.

As generally indicated in FIG. 6, the inlet manifold 80 includes a plurality of guide vanes 84 to direct the cooling air from where it is initially received to each of the battery packs 20. Although the guide vanes 84 help to direct the cooling air evenly into the battery packs 20, the geometry of the inlet manifold 80 and other design constraints limit the degree to which even flow distribution can be achieved within a battery pack 20. Metering of the flow at the inlet and or the outlet achieves very uniform flow distribution across the entire battery pack 20 while utilizing a relatively low amount of power.

As shown in FIG. 7, an inlet metering plate 86 is sandwiched between the inlet bus bar 68 and the battery packs 20 to meter the uneven flow of cooling air generated by the inlet manifold 80. The inlet metering plate 86 evenly divides the uneven flow of cooling air and directs the resultant evenly divided streams over the battery packs 20. As each battery pack 20 generates essentially the same amount of heat through charging and discharging, these evenly divided streams of cooling air cool each battery pack 20 evenly and achieve the goal of maintaining all of the battery packs 20 at a substantially uniform temperature. To meter the incoming cooling air, the inlet metering plate 86 utilizes a plurality of apertures 88, which apertures 88 are defined by the metering plate.

The apertures 88 are designed such that the flow rate of cooling air exiting each of the apertures 88 is equal despite the uneven nature of the incoming air from the inlet manifold 80. The inlet metering plate 86 defines one aperture 88 for each battery pack 20 in the assembly. Each of the apertures 88 is aligned with the inlet chambers 52 of the respective battery pack 20. As a result, each aperture 88 conveys its equal stream of cooling air into the inlet chambers 52 of the respective battery pack 20.

The apertures 88 are drilled, cut, or molded into the inlet metering plate 86. The walls of the apertures 88 converge as they extend through the inlet metering plate 86, and as such, create an entry opening 90 and an exit opening 92. The area of the entry opening 90 is greater than the area of the exit opening 92. The size and shape of the entry opening 90 of each of the apertures 88 is independent of the size and shape of each of the other apertures 88. Additionally, the rate at which each of the apertures 88 converges as it extends through the metering plate varies from aperture 88 to aperture 88.

The metering of the uneven stream of incoming cooling air is accomplished by varying the size and shape of the periphery of the apertures 88 in the metering plate based on the flow characteristics of the incoming cooling air. For example, where the air source is near an outer edge of the inlet manifold 80, the apertures 88 corresponding to the battery packs 20 near that outer edge will be larger in area and the apertures 88 farther from that outer edge will be smaller in area. The velocity of the incoming air will be highest at its point of entrance into the inlet manifold 80 and it will decrease as it proceeds away from the point of entrance. Smaller apertures 88 limit the amount of high-velocity incoming air conveyed through to the battery packs 20 near the center while larger apertures 88 allow more of the lower-velocity air to pass through the battery packs 20 from the outer edge. By analyzing the flow characteristics and velocity profiles of the incoming cooling air and arranging the apertures 88 so as to have smaller apertures 88 metering the high-velocity incoming air and larger apertures 88 metering the lower-velocity incoming air, an equal quantity of incoming air is separated and distributed to each battery pack 20.

The metering is also accomplished by varying the rate of convergence of each aperture 88. As cooling air flows through a converging aperture 88, the velocity of the air increases. This increase in velocity leads to an increase in turbulence and an increase in local heat transfer coefficient. Hence, an aperture 88 that has a high rate of convergence will cool (locally) more effectively than an aperture 88 with a lower rate of convergence. The size of the periphery, the shape of the periphery, and the rate of convergence of each of the apertures 88 of the inlet metering plate 86 can be varied from aperture 88 to aperture 88 to achieve equal air streams entering each battery pack 20.

Additionally, as the shape of the openings 74 in the inlet bus bar 68 may vary dependent upon the method of manufacture, the size and shape of each of the apertures 88 can be varied to accommodate the variations is size and shape of the openings 74 in the inlet bus bar 68.

Figure 8:
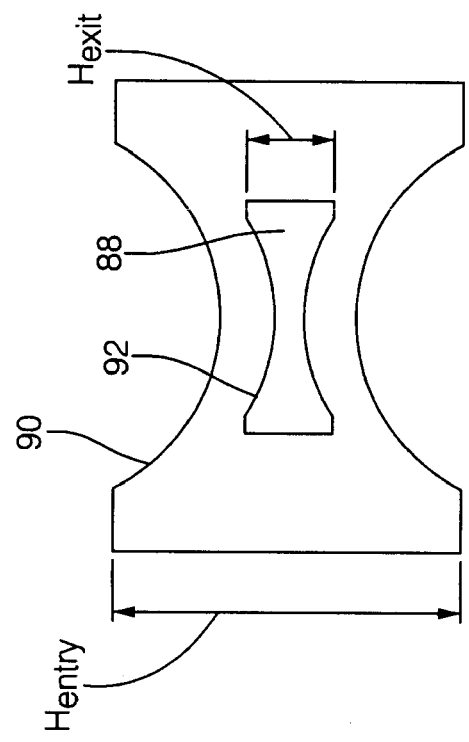
FIG. 8 is a front view of an hourglass aperture defined by an inlet metering plate of the embodiment of FIG. 1.

The first embodiment of the invention utilizes apertures 88 in the shape of a horizontal hourglass as shown in FIG. 8. This shape of aperture 88 best fits with sinusoidal openings 74 in the inlet bus bar 68. Each aperture 88 is positioned, with the respective battery pack 20, such that the inlet chambers 52 of the battery pack 20 align with the hourglass shape and none of the aperture 88 aligns with the upper or lower stacks 22, 24 nor does any of the aperture 88 align with the open recesses 56 created by the casing 26. As such, the metering plate prevents cooling air from entering the open recesses 56, thus reducing the possibility of wind noise and maximizing the amount of cooling air flowing through the apertures 88 and over the cells 28. Very little cooling air is conveyed outside of the inlet chambers 52, as such, highly efficient cooling is achieved and excess wind noise is avoided. The size and shape of the peripheries of the apertures 88 are not varied from aperture 88 to aperture 88 in this embodiment. However, the rate of convergence can be varied from aperture 88 to aperture 88. The entry opening 90 of each hourglass aperture 88 has an entry height $H_{entry}$ and the exit opening 92 of each hourglass aperture 88 has an exit height $H_{exit}$. The rate of convergence, in this case, is measured by the ratio of entry height $H_{entry}$ to exit height $H_{exit}$. The recommended range of $H_{entry}/H_{exit}$ is $1.5 < H_{entry}/H_{exit} < 4$. The maximum area $A_{max}$ of the entry 62 of an aperture 88, $A_{entrymax}$, and the minimum area $A_{min}$ of the entry 62 of an aperture 88, $A_{entrymin}$, is within the range of $1 < A_{entrymax}/A_{entrymin} < 4$.

Figure 9:
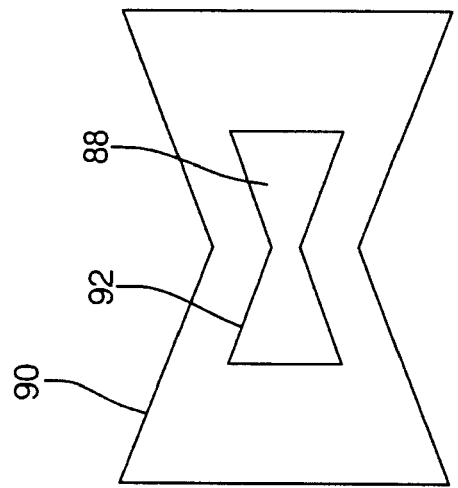
FIG. 9 is a front view of an alternative bow-tie aperture defined by a second embodiment of the inlet metering plate.

A second embodiment utilizes apertures 88 in the general shape of a bow tie as shown in FIG. 9. This shape of aperture 88 best fits with sinusoidal openings 74 in the inlet bus bar 68 openings 74. The upper-left and lower-right corners of the bow tie are skewed toward horizontal to prevent cooling air from entering the open recessed created by the casing 26. Each aperture 88 is positioned, with the respective battery pack 20, such that the inlet chambers 52 of the battery pack 20 align with the bow tie shape and none of the aperture 88 aligns with the upper or lower stacks 22, 24 nor does any of the aperture 88 align with the open recesses 56 created by the casing 26. As such, the metering plate prevents cooling air from entering the open recesses 56, thus eliminating the possibility of wind noise and maximizing the amount of cooling air flowing through the apertures 88 and over the cells 28. Very little cooling air is conveyed outside of the inlet chambers 52, as such, highly efficient cooling is achieved and excess wind noise is avoided. The size and shape of the peripheries of the apertures 88 are not varied from aperture 88 to aperture 88 in this embodiment. However, the rate of convergence can be varied from aperture 88 to aperture 88. As with the aperture 88 shape of the first embodiment, very little cooling air is conveyed outside of the inlet chambers 52, as such, highly efficient cooling is achieved and excess wind noise is avoided.

Figure 10:
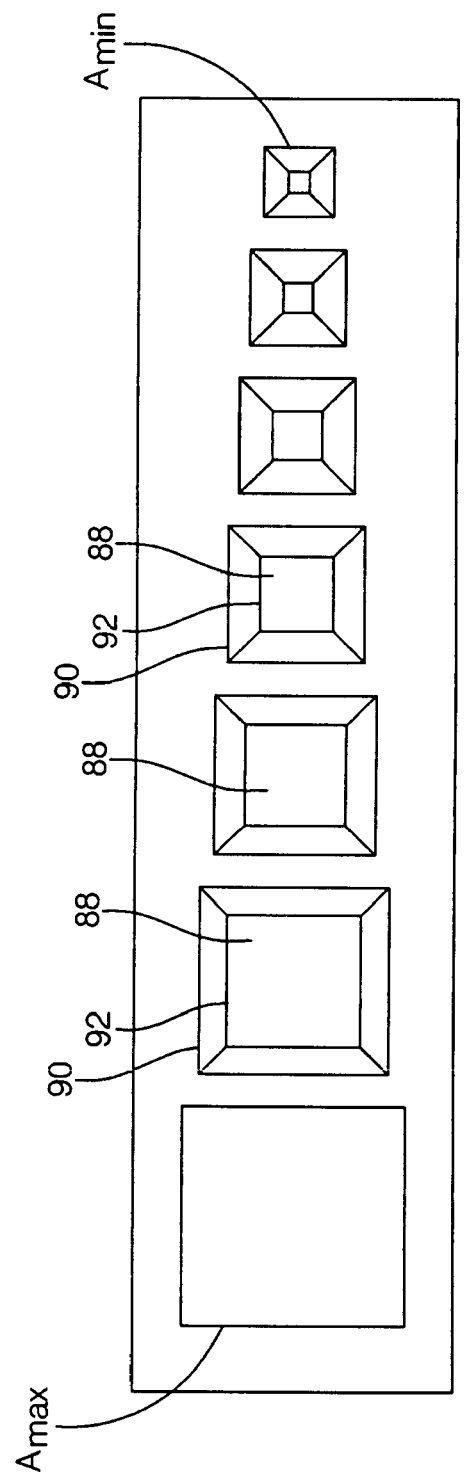
FIG. 10 is a front view of an alternative square aperture defined by a third embodiment of the inlet metering plate.

A third embodiment utilizes rectangular shaped apertures 88 as shown in FIG. 10. Each aperture 88 is positioned to align with one respective battery pack 20. In this embodiment, the size of the apertures 88 varies from aperture 88 to aperture 88. The recommended area of entry openings 90 of apertures 88 varies from maximum area $A_{max}$ to minimum area $A_{min}$ wherein $1 < A_{max}/A_{min} < 4$. The rate of convergence also varies from aperture 88 to aperture 88. The entry opening 90 of each rectangular aperture 88 has an entry area $A_{entry}$ and the exit opening 92 of each rectangular aperture 88 has an exit area $A_{exit}$. The rate of convergence is measured by the ratio of $A_{entry}$ to $A_{exit}$. The recommended range of $A_{entry}/A_{exit}$ is $1 < A_{entry}/A_{exit} < 4$. Also, the maximum area $A_{max}$ of the entry 62 of an aperture 88, $A_{entrymax}$, and the minimum area $A_{min}$ of the entry 62 of an aperture 88, $A_{entrymin}$, is within the range of $1 < A_{entrymax}/A_{entrymin} < 4$.

Figure 11:
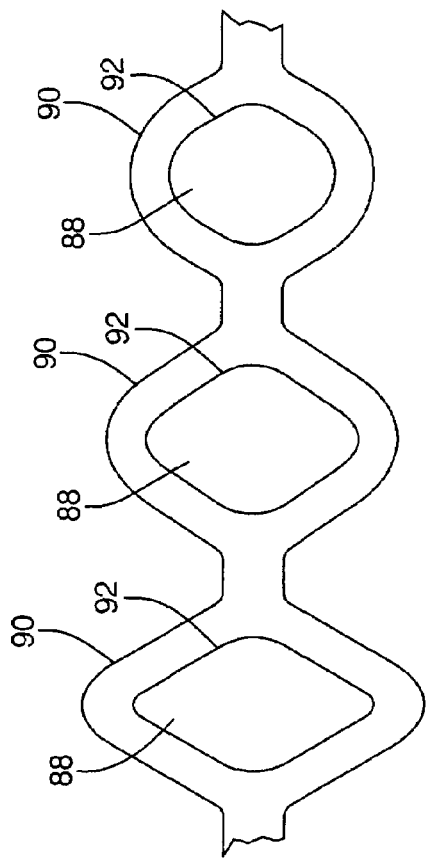
FIG. 11 is a front view of an alternative circular aperture defined by a fourth embodiment of the inlet metering plate.

A fourth embodiment utilizes circular shaped apertures 88 as shown in FIG. 11. Each aperture 88 is positioned to align with one respective battery pack 20. In this embodiment, the size of the apertures 88 varies from aperture 88 to aperture 88 as does the rate of convergence. The entry opening 90 of each circular aperture 88 has an entry diameter $D_{entry}$ and the exit opening 92 of each circular aperture 88 has an exit diameter $D_{exit}$. The rate of convergence is measured by the ratio of $D_{entry}$ to $D_{exit}$. The recommended range of $D_{entry}/D_{exit}$ is $1 < D_{entry}/D_{exit} < 4$. Also, the maximum diameter $D_{max}$ of the entry 62 of an aperture 88, $D_{entrymax}$, and the minimum diameter $D_{min}$ of the entry 62 of an aperture 88, $D_{entrymin}$, is within the range of $1 < D_{entrymax}/D_{entrymin} < 4$.

Figure 12:
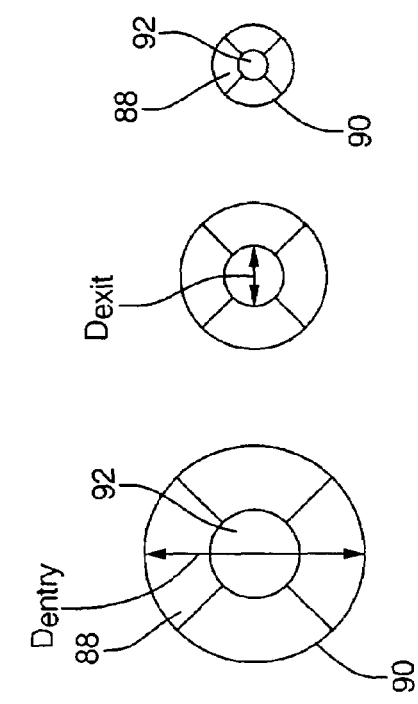
FIG. 12 is a front view of an alternative oval aperture defined by a fifth embodiment of the inlet metering plate.
Figure 13:
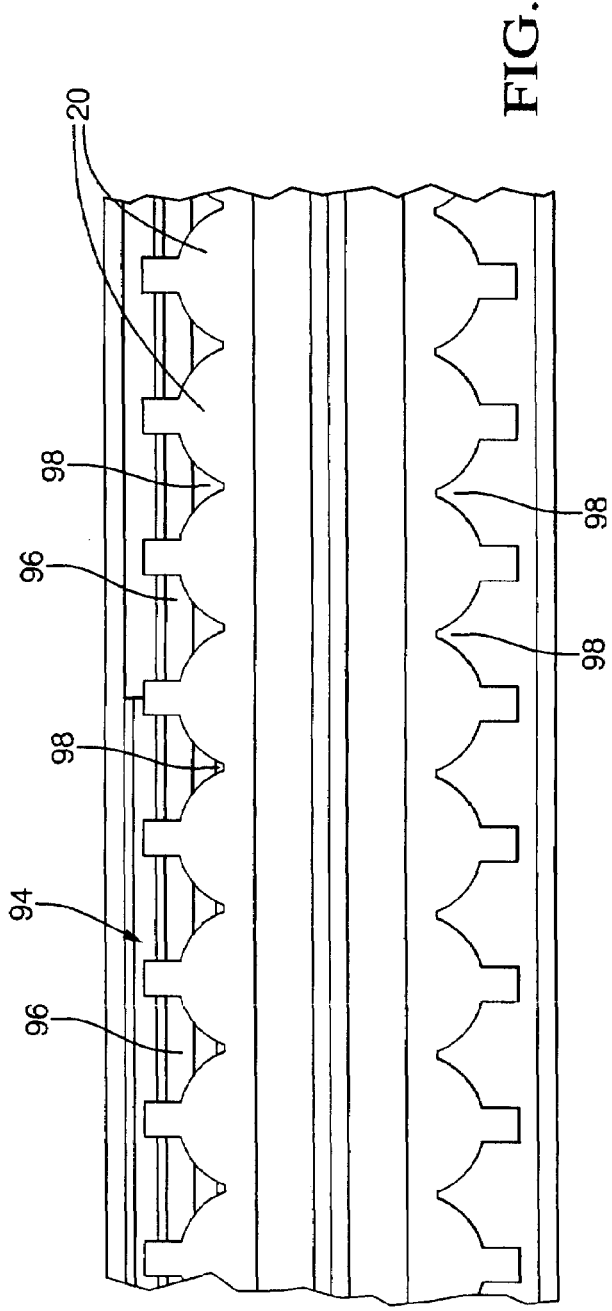
FIG. 13 is a cross-sectional view of FIG. 1 taken along the line 13-13.

A fifth embodiment utilizes oval shaped apertures 88 as shown in FIG. 12. Each aperture 88 is positioned to align with one respective battery pack 20. The oval shapes can vary from being relatively circular to being oblong. The size of the apertures 88 can vary from aperture 88 to aperture 88 and the rate of convergence can vary from aperture 88 to aperture 88.

Referring generally to all of the embodiments, an outlet metering plate 94 is sandwiched between the outlet bus bar 72 and the battery packs 20 to meter the flow of outgoing cooling air through the V-shaped channels 78 of the upper cylindrical sections 36 and the lower cylindrical sections 38 to evenly cool the cells 28 within each stack. The purpose of the outlet metering plate 94 is to maintain a uniform temperature from cells 28 in the upper stack 22 to cells 28 in the lower stack 24 as opposed to the purpose of the inlet metering plate 86, which is to maintain a uniform temperature from battery pack 20 to battery pack 20. The outlet metering plate 94 maintains a uniform temperature from cells 28 in the upper stack 22 to cells 28 in the lower stack 24 by controlling the amount of the outgoing cooling air around the cells 28 of the upper stacks 22 and the lower stacks 24. In doing this, a more uniform flow of cooling air is realized from the first cell 28 to the last cell 28 in the upper and lower stacks 22, 24. The uniform flow of cooling air leads to a uniform temperature across the cells 28. To accomplish this uniform flow, the outlet metering plate 94 includes a plurality of blocking panels 96, each of which align with one of the channels 78 of the upper cylindrical sections 36 and the lower cylindrical sections 38.

Each blocking panel 96 is generally trapezoidal in shape and blocks a portion of the exit of the respective channel 78. By blocking the portion of the exit, the blocking panel 96 defines an outlet aperture 98 being the remainder of the exit of the channel 78 through which the cooling air is discharged. The metering of the outgoing cooling air is accomplished by varying the size of the outlet apertures 98. Due to the even air flows entering each battery pack 20, each channel 78 conveys essentially the same airflow. As the area of a particular outlet aperture 98 decreases, the velocity of the air traveling therethrough increases. This acceleration of flow rate causes more cooling air to be sucked from the last cell 28, which provides more heat transfer and, hence, cools the cell 28 further. This is a secondary benefit reaped by the last cells 28 of the more restrictive part of the outlet metering plate 94.

As noted above, each blocking panel 96 corresponds and aligns with one channel 78. As cell 28 temperatures vary from battery pack 20 to battery pack 20, the size and shape of the outlet aperture 98 will also vary from outlet aperture 98 to outlet aperture 98 based on upper stack 22 and lower stack 24 airflow disparity within a battery pack 20 element. If the upper stack 22 requires more heat transfer, a larger outlet aperture 98 will be required to force a larger amount of cooling air flow around the upper cells 28. Accordingly, the shape of the blocking panel 96 will increase in the lower part of the stack so as to define a smaller outlet aperture 98, thus forcing less air through the lower stack 24.

As noted above, the outlet metering plate 94 can be sandwiched between the outlet bus bar 72 and the battery packs 20 and aligned with the channels 78 of the upper cylindrical sections 36 and lower cylindrical sections 38. In the alternative, the outlet metering plate 94 can be disposed at the end of the channels 78 directly atop the battery packs 20.

Both the inlet metering plate 86 and the outlet metering plate 94 can be used individually or in conjunction with one another. In the case where the two are used together, the apertures 88 in the inlet metering plate 86 and the outlet apertures 98 in the outlet metering plate 94 can be varied so as to achieve uniform cooling air flow into each of the battery packs 20 and uniform cooling air flow over each of the cells 28 in each of the battery packs 20.

Both the inlet metering plate 86 and the outlet metering plate 94 can include additional noise treatments to further reduce wind noise as is known in the art. As an example, the metering plates 86, 94 can be sprayed with noise reducing foam or with rubber. Alternatively, a finely reticulated foam screen can be attached to the metering plates 86, 94 to achieve the same goal.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A battery pack assembly for providing electrical power comprising;

a plurality of battery packs each including a plurality of cells each having an anode and a cathode for storing and transmitting electrical power disposed in a side by side relationship with each battery pack defining an air path therethrough for cooling, and at least one metering device for metering the quantity of air flowing respectively through said air paths to evenly cool all of said battery packs to a substantially uniform temperature;

wherein said metering device is a metering plate defining a plurality of apertures for metering air flow into said air paths of said battery packs, and wherein said metering plate is disposed upstream of said battery packs and each of said apertures converges as said aperture extends through said metering plate creating an entry opening having area, $A_{entry}$, and an exit opening having area, $A_{exit}$, to establish a ratio, $A_{entry}/A_{exit}$, greater than one.

2. An assembly as set forth in claim 1 wherein said ratio of $A_{entry}/A_{exit}$, is within the range of $1 < A_{entry}/A_{exit} < 4$.

3. An assembly as set forth in claim 2 wherein the area, $A_{entry}$, establishes a maximum, $A_{entry\ max}$, and a minimum, $A_{entry\ min}$, and the ratio of $A_{entry\ max}/A_{entry\ min}$ is within the range of $1 < A_{entry\ max}/A_{entry\ min} < 4$.

4. An assembly as set forth in claim 1 wherein each of said air paths is metered by one of said apertures and said apertures vary in said ratio, $A_{entry}/A_{exit}$, from aperture to aperture.

5. An assembly as set forth in claim 1 wherein said apertures vary in exit opening area, $A_{exit}$, from aperture to aperture.

6. An assembly as set forth in claim 1 wherein each of said apertures is generally hour-glass shaped.

7. An assembly as set forth in claim 1 wherein each of said apertures is generally bow-tie shaped.

8. An assembly as set forth in claim 1 wherein each of said apertures is rectangular in shape.

9. An assembly as set forth in claim 1 wherein each of said apertures is circular in shape.

10. An assembly as set forth in claim 1 wherein each of said apertures is generally oval in shape.

11. An assembly as set forth in claim 1 including an inlet bus bar for electrically interconnecting said battery packs and sandwiching said metering plate between said inlet bus bar and said battery packs with said inlet bus bar defining a plurality of openings for conveying air therethrough to said apertures.

12. An assembly as set forth in claim 1 wherein said apertures vary in area from aperture to aperture.

13. An assembly as set forth in claim 10 wherein the shape of the periphery of each of said apertures varies from aperture to aperture.

14. An assembly as set forth in claim 11 wherein said metering plate is disposed downstream of said battery packs and said apertures define outlet apertures.

15. An assembly as set forth in claim 12 including an outlet bus bar for electrically interconnecting said battery packs and sandwiching said metering plate between said outlet bus bar and said battery packs.

16. An assembly as set forth in claim 1 including two of said metering plates one of which defines an inlet metering plate disposed upstream of said battery packs and the other defines an outlet metering plate disposed downstream of said battery packs.

17. An assembly as set forth in claim 16 wherein each of said apertures in said inlet metering plate vary in area from inlet metering plate aperture to inlet metering plate aperture and each of said apertures in said outlet metering plate vary in area from outlet aperture to outlet aperture.

18. An assembly as set forth in claim 17 including an inlet bus bar for electrically interconnecting said battery packs and sandwiching said inlet metering plate between said inlet bus bar and said battery packs with said inlet bus bar defining a plurality of openings for conveying air therethrough to said apertures and an outlet bus bar for electrically interconnecting said battery packs and sandwiching said outlet metering plate between said outlet bus bar and said battery packs.

* * * * *